United States Patent [19]

Watanabe et al.

[11] Patent Number: 5,036,027
[45] Date of Patent: Jul. 30, 1991

[54] RESISTIVE PASTE AND RESISTOR MATERIAL THEREFOR

[75] Inventors: Shizuharu Watanabe, Kyoto; Hiroji Tani; Keisuke Nagata, both of Nagaokakyo, all of Japan

[73] Assignee: Murata Manufacturing Co., Ltd., Japan

[21] Appl. No.: 497,402

[22] Filed: Mar. 22, 1990

[30] Foreign Application Priority Data

Mar. 22, 1989 [JP] Japan ................................. 1-69764

[51] Int. Cl.$^5$ ......................... C04B 35/58; H01B 1/20
[52] U.S. Cl. ......................................... 501/96; 501/98; 252/518; 252/521
[58] Field of Search ..................... 501/96, 98, 32; 252/518, 521

[56] References Cited

U.S. PATENT DOCUMENTS

| | | | |
|---|---|---|---|
| 3,932,314 | 1/1976 | Kawabe et al. | 252/521 |
| 4,200,555 | 4/1980 | Joy et al. | 252/521 |
| 4,225,468 | 9/1980 | Donohue et al. | 252/521 |
| 4,512,917 | 4/1985 | Donohue | 252/521 |
| 4,585,580 | 4/1986 | Donohue | 252/521 |
| 4,597,897 | 7/1986 | Donohue | 252/521 |
| 4,661,740 | 4/1987 | Knoch et al. | 252/521 |

FOREIGN PATENT DOCUMENTS

| | | | |
|---|---|---|---|
| 0008132 | 2/1980 | European Pat. Off. | 252/521 |
| 0008133 | 2/1980 | European Pat. Off. | 252/521 |
| 0008437 | 3/1980 | European Pat. Off. | 252/521 |
| 2397704 | 3/1979 | France | 252/521 |

Primary Examiner—William R. Dixon, Jr.
Assistant Examiner—Anthony J. Green
Attorney, Agent, or Firm—Ostrolenk, Faber, Gerb & Soffen

[57] ABSTRACT

A resistive paste consists essentially of a solid component dispersed in an organic vehicle, the solid component consisting essentially of 5 to 70 parts by weight of a resistor material, and 30 to 95 parts by weight of non-reducing vitreous material. The resistor material has a composition expressed by the general formula:

$$Nb_xLa_{1-x}B_{6-4x}$$

wherein x is a mol fraction of Nb and takes a value within the following range: $0.1 \leq x \leq 0.9$.

3 Claims, 1 Drawing Sheet

RESISTIVE PASTE AND RESISTOR MATERIAL THEREFOR

BACKGROUND OF THE INVENTION

1. Field of the Invention

The present invention relates to a resistive paste and a resistor material for the same.

2. Description of the Prior Art

In the manufacture of ceramic printed circuit boards, alumina or zirconia, ceramic substrates are generally provided with circuit patterns printed thereon in the form of electrodes and resistors. Separately manufactured electronic components or parts are mounted on the boards. The electrodes of the printed-circuit boards are generally formed by screen printing a conductor pattern on a substrate with a conductive paste, and then baking the same in air. Noble metals such as silver, silver-palladium alloys and the like have been widely used as conductor materials for the conductive paste.

Recently, however, there has been a tendency to use base metals such as copper, nickel, aluminum and the like as conductor materials for conductive paste because of the high costs involved in using the noble metals. Since these base metals are easily oxidized a resistive paste must be used, which can be baked in a neutral or reducing atmosphere to prevent oxidation during formation of resistors.

To this end, various resistive pastes which have been proposed which can be baked in a neutral or reducing atmosphere. For example, Japanese patent publications Nos. 59-6481 and 58-21402 disclose a resistive paste comprising $LaB_6$ as a resistor material. Japanese patent Laid-open No. 63-224301 discloses a resistive paste containing $NbB_2$ as a resistor material. In the resistive paste, a resistor material is dispersed in an organic vehicle together with a glass component serving as a binder. The sheet resistivity of the resultant resistors is controlled by the content of the glass component.

However, the resistive pastes of the prior art have some problems. For example, the sheet resistivity for resistive paste containing $LaB_6$ increases abruptly with an increasing content of the glass component when it goes beyond about 50 $\Omega$/square. On the other hand, the resistive paste containing $NbB_2$ makes it possible to produce resistors with a sheet resistivity of about 100 $\Omega$/square and its sheet resistivity increases exponentially when the content of glass component exceeds about 50 wt %. For these reasons, the resistive paste of the prior art are hard to reproduce if a large sheet resistivity, is only. As a result it is only possible to produce resistors with a sheet resistivity ranging from 10 $\Omega$/square to 10 K$\Omega$/square using the resistive pastes of the prior art.

SUMMARY OF THE INVENTION

It is an object of the present invention to provide a resistive paste with good reproducibility, which makes it possible to produce resistors with any desired sheet resistivity within a wide range.

Another object of the present invention is to provide a resistor material which can be baked in a neutral or reducing atmosphere without causing variation of its electrical characteristics.

Still another object of the present invention is to provide a method for producing such a resistor material.

DETAILED DESCRIPTION OF THE PREFERRED EMBODIMENT

According to the present invention, there is provided a resistor material having a composition expressed by the general formula: $Nb_xLa_{1-x}B_{6-4x}$ wherein x is a mol fraction of Nb and takes a value within the following range: $0.1 \leq x \leq 0.9$.

The above resistor material may be produced by a method comprising the steps of mixing $NbB_2$ and $LaB_6$ in a predetermined ratio to produce a compound expressed by the general formula: $Nb_xLa_{1-x}B_{6-4x}$ wherein x is a mol fraction of Nb and takes a value within the following range: $0.1 \leq x \leq 0.9$, and then heat-treating the resultant mixture in a neutral or reducing atmosphere.

According to the present invention, a resistive paste is provided consisting essentially of a solid component dispersed in an organic vehicle. The solid component consists essentially of 5 to 70 parts by weight of a resistor material, and 30 to 95 parts by weight of a nonreducing vitreous material. The resistor material has a composition expressed by the general formula:

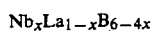

$$Nb_xLa_{1-x}B_{6-4x}$$

wherein x is a mol fraction of Nb and takes a value within the following range: $0.1 \leq x \leq 0.9$.

In the resistor material of the present invention, the mol fraction of Nb, i.e., x has been limited to a value ranging from 0.1 to 0.9 for the following reasons. If x is less than 0.1, it is impossible to increase the sheet resistivity. If x exceeds 0.9, the change rate of sheet resistivity with the content of glass frit becomes considerably large, thus making it difficult to improve the reproducibility of large sheet resistivity.

As a nonreducing vitreous material, any one of the conventionally known glass compositions may be used such as, for example, a $B_2O_3$—$SiO_2$—$BaO$—$CaO$—$Nb_2O_3$ system.

The mixing ratios of the resistor material to glass frit have been limited to those ranging from 70:30 to 5:95 for the following reasons. If the content of the glass frit is less than 30 parts by weight, the adhesion of the produced resistors to the substrate becomes lowered. If the content of the glass frit exceeds 95 parts by weight, the glass component begins to flow during firing, resulting in lowering of the solderability of the electrodes.

According to the present invention, it is possible to provide resistive paste to produce resistors with any desired sheet resistivity ranging from 10 $\Omega$/square to 10 M$\Omega$/square. The sheet resistivity of the resistor material per se may be varied by varying the mol fractions of Nb in $Nb_xLa_{1-x}B_{6-4x}$ within the range of from 0.1 to 0.9. The sheet resistivity of the resistors may be varied linearly in a wide range depending on the content of the glass frit.

The invention will be further apparent from the following explanation in connection with the accompanying drawings and examples.

EXAMPLE

Figure 1:
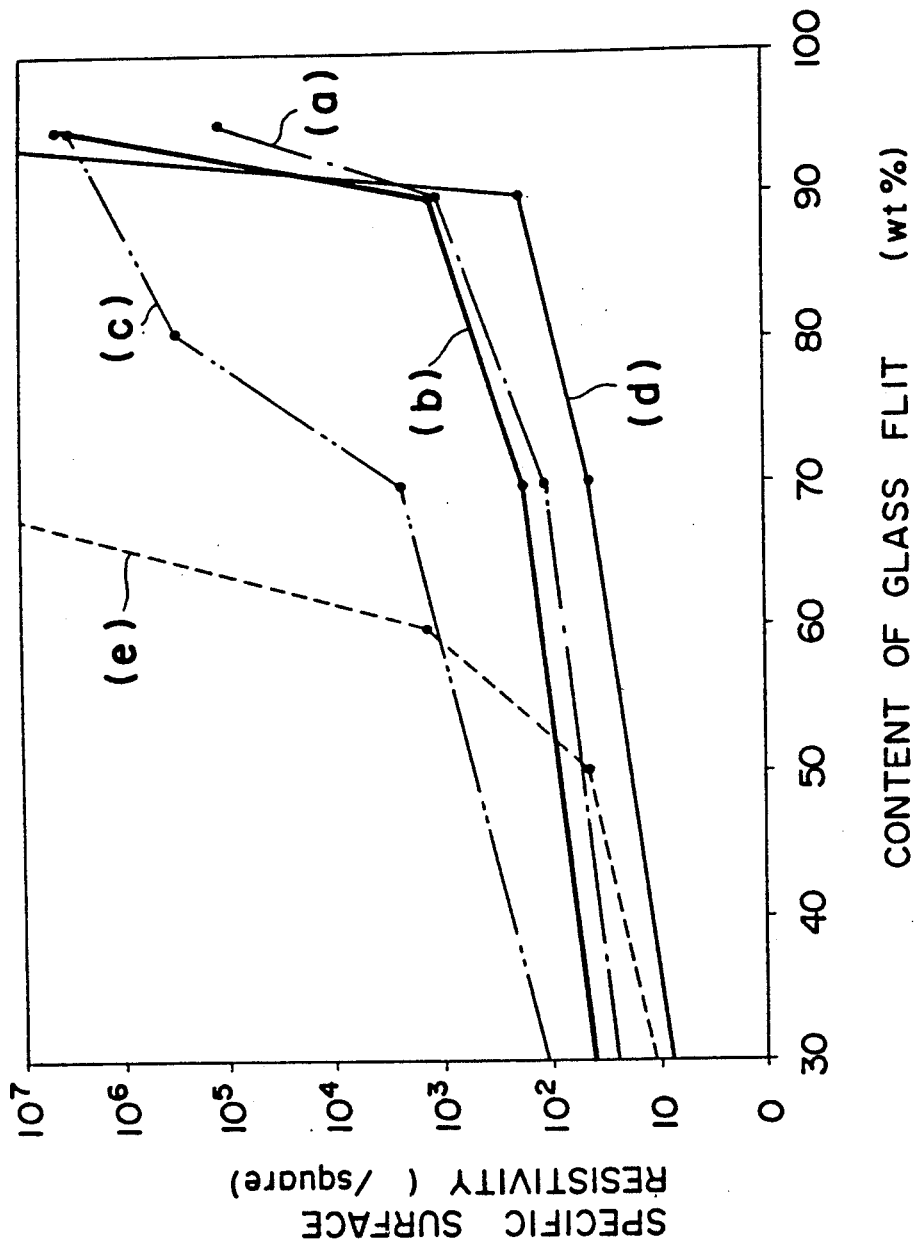
FIG. 1 is a graph showing the relationship between sheet resistivity and the content of glass frit for various resistive paste.

Using an alumina substrate as an insulating substrate, there was first prepared a printed-wiring board by screen printing a copper paste on the alumina substrate, and then baking the same in a nitrogen atmosphere to form copper electrodes.

Separate from the above, resistor materials were prepared in the following manner. The raw materials, $NbB_2$ and $LaB_6$ were weighed and mixed in such a ratio that the mol fraction of Nb, i.e., x took the values shown in Table 1. The resultant mixture was heated to 1000° C. at a rate of 5° C./min and then heat-treated at that temperature for 2 hours in a nitrogen atmosphere to prepare a solid solution expressed by the general formula: $Nb_xLa_{1-x}B_{6-4x}$, where x took a value ranging from 0.1 to 0.9. The product was ground together with a suitable amount of acetone by a vibration mill, and then dried to form a powdered resistor material having a mean particle size of 1 μm.

A glass frit was then prepared using $B_2O_3$, $SiO_2$, BaO, CaO and $Nb_2O_3$ as raw materials. The raw materials were weighed and mixed in the mol ratios 36.05:31.67:18.02:9.26:5.00, and then heated to 1200° to 1350° C. to prepare molten glass. The melt was rapidly cooled in pure water, and then ground by a vibration mill to prepare a glass frit having with a mean particle size of not more than 5 μm.

The resistor material and glass frit were mixed in the proportions shown in Table 1, and added to an organic vehicle consisting of acrylic resin diluted with α-terpineol. The mixture was then kneaded to prepare a resistive paste. The weight ratio of the solid component (i.e., resistor material and glass frit) to the organic vehicle was 72:28.

The resultant resistive paste was screen printed between adjacent copper electrodes on the printed-wiring board to form resistor patterns 1.5 mm long and 1.5 mm wide, connected at both ends to the adjacent copper electrodes. The paste was dried at 150° C. for 10 minutes, and then baked in a tunnel furnace at a peak temperature of 900° C. for 10 minutes in a nitrogen atmosphere to complete a specimen of a printed-circuit board.

(COMPARATIVE EXAMPLE 1)

Using $NbB_2$ or $LaB_6$ as a resistor material, a resistive paste was prepared in the same manner as Example 1. Using each of the thus prepared resistive pastes, there specimens Nos. 1 to 4, and 24 to 27 were prepared in the same manner as above.

For each specimen, the sheet resistivity of the resistor was measured. The results are shown in Table 1. In this table, specimens with an asterisk (*) are those having a composition out of the scope of the present invention.

The data for the specimens with the same value of x are plotted in FIG. 1 to determine the relationship between sheet resistivity and the content of glass frit.

In FIG. 1, curve (a) shows the relationship between sheet resistivity and the content of glass frit when x is 0.25 (specimens No. 9–12), curve (b) shows this relationship when x is 0.50 (specimens No. 13–16), (c) shows this relationship when x=0.75 (specimens No. 17–19), curve (d) shows this relationship when x=0.00 (specimens No. 1–4), and curve (e) shows this relationship when x=1.00 (specimens No. 24–27).

TABLE I

| Nos. | x | resistor material (wt %) | glass frit (wt %) | Sheet resistivity (Ω/square) |
|---|---|---|---|---|
| 1* | 0.00 | 70 | 30 | 9.2 |
| 2* | 0.00 | 30 | 70 | 64.5 |
| 3* | 0.00 | 10 | 90 | 250.7 |
| 4* | 0.00 | 5 | 95 | 112M |
| 5 | 0.10 | 70 | 30 | 12.2 |
| 6 | 0.10 | 30 | 70 | 86.3 |
| 7 | 0.10 | 10 | 90 | 762.6 |
| 8 | 0.10 | 5 | 95 | 16.8K |
| 9 | 0.25 | 70 | 30 | 41.4 |
| 10 | 0.25 | 30 | 70 | 103.3 |
| 11 | 0.25 | 10 | 90 | 1.01K |
| 12 | 0.25 | 5 | 95 | 123.2K |
| 13 | 0.50 | 70 | 30 | 64.2 |
| 14 | 0.50 | 30 | 70 | 226.6 |
| 15 | 0.50 | 10 | 90 | 1.68K |
| 16 | 0.50 | 5 | 95 | 6.80M |
| 17 | 0.75 | 70 | 30 | 135.2 |
| 18 | 0.75 | 30 | 70 | 3.75K |
| 19 | 0.75 | 20 | 80 | 417.1K |
| 20 | 0.75 | 10 | 90 | 5.28M |
| 21 | 0.90 | 70 | 30 | 308.4 |
| 22 | 0.90 | 50 | 50 | 1.38K |
| 23 | 0.90 | 30 | 70 | 1.37M |
| 24* | 1.00 | 70 | 30 | 12.9 |
| 25* | 1.00 | 50 | 50 | 65.6 |
| 26* | 1.00 | 40 | 60 | 1.32K |
| 27* | 1.00 | 30 | 70 | 101.6M |

As will be seen from the data for specimens Nos. 5 to 23 shown in Table 1 and FIG. 1, the change rate of the sheet resistivity is low with an increase of x within the range of from 0.1 to 0.9, thus making it easy to produce resistors with a desired high resistance. Thus, the present invention makes it possible to improve the reproducibility of the resistors.

In contrast therewith, in specimens Nos. 1–4 with x=0.00, i.e., the resistor material consisting only of $LaB_6$, the sheet resistivity increased abruptly when the mixing ratio of resistor material to glass frit exceeded 10:90. Thus, the sheet resistivity varied greatly with a small change in the mixing ratios of resistor material to glass frit, thus making it considerably difficult to produce resistors with any desired resistances of not less than 1 KΩ/square, resulting in poor reproducibility of the resistors. Also, it will be seen from the data for specimens Nos. 24–27 that, if x=1.00, i.e., if the resistor material consists only of $NbB_2$, the sheet resistivity increases abruptly when the mixing ratio of resistor material to glass frit exceeds 40:60. Since the sheet resistivity varies greatly with a small change in the mixing ratio of resistor material to glass frit, this makes it considerably difficult to produce resistors with desired resistances of not less than 1 KΩ/square.

(COMPARATIVE EXAMPLE 2)

A resistive paste was prepared using $NbB_2$ and $LaB_6$ as resistor materials. The paste was prepared by mixing powders of $NbB_2$ and $LaB_6$ in the mol ratios shown in Table 2. A glass frit prepared in Example 1, in the proportions shown in Table 2 and mixed with the powder. The resultant mixture was added to an organic vehicle as in Example 1 and then kneaded to prepare a resistive paste. The mixing ratio by weight of the solid component i.e., resistor material and glass frit, to the organic vehicle was 72:28.

Using the resistive paste, specimens were prepared in the same manner as Example 1.

For each specimen, the sheet resistivity of the resistor was measured. The results are shown in Table 2.

TABLE 2

| | $NbB_2$ (mol) | $LaB_6$ (mol) | Resistor material (wt %) | glass frit (wt %) | Sheet resistivity ($\Omega$/square) |
|---|---|---|---|---|---|
| 28* | 0.25 | 0.75 | 30 | 70 | 49.2 |
| 29* | 0.50 | 0.50 | 15 | 85 | 214.1 |
| 30* | 0.85 | 0.15 | 20 | 80 | 20.8K |
| 31* | 0.90 | 0.10 | 50 | 50 | 14.5 |
| 32* | 0.95 | 0.05 | 20 | 80 | 675.4K |

From the above results, it can be seen that the resistive paste which contains $NbB_2$ and $LaB_6$ in the form of respective borates, provides a maximum sheet resistivity of only 675.4 K$\Omega$/square even when the content of $NbB_2$ is 95%. This shows that it is impossible to control the sheet resistivity of the resistors by merely mixing $NbB_2$ and $LaB_6$ so as to have a sheet resistivity somewhere between the respective sheet resistivities of $NbB_2$ and $LaB_6$.

What is claimed is:

1. A resistor material having a composition expressed by the general formula: $Nb_xLa_{1-x}B_{6-4x}$ wherein x is a mol fraction of Nb and takes a value within the range: $0.1 \leq x \leq 0.9$.

2. A resistor material claimed in claim 1 wherein said resistor material is produced by mixing $NbB_2$ and $LaB_6$, and then firing the resultant mixture in a neutral or reducing atmosphere.

3. A resistive paste consisting essentially of a solid component dispersed in an organic vehicle, said solid component consisting essentially of 5 to 70 parts by weight of a resistor material, and 30 to 95 parts by weight of nonreducing vitreous material, said resistor material having a composition expressed by the general formula:

$$Nb_xLa_{1-x}B_{6-4x}$$

wherein x is a mol fraction of Nb and takes a value within the range: $0.1 \leq x23\ 0.9$.

* * * * *